(12) United States Patent
Kojima et al.

(10) Patent No.: US 8,469,525 B2
(45) Date of Patent: Jun. 25, 2013

(54) PROJECTION-TYPE DISPLAY APPARATUS

(75) Inventors: Kuniko Kojima, Tokyo (JP); Hayato Takeuchi, Tokyo (JP); Tomohiro Sasagawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 518 days.

(21) Appl. No.: 12/644,731

(22) Filed: Dec. 22, 2009

(65) Prior Publication Data

US 2010/0165301 A1    Jul. 1, 2010

(30) Foreign Application Priority Data

Dec. 25, 2008 (JP) ................................. 2008-331424

(51) Int. Cl.
  *G03B 21/20* (2006.01)
(52) U.S. Cl.
  USPC ............... 353/102; 353/30; 353/31; 353/32; 353/84; 353/99; 348/745; 359/563
(58) Field of Classification Search
  USPC ............... 353/20, 30, 31, 32, 37, 38, 84, 76, 353/98, 99, 102; 359/15, 19, 20, 563, 558, 359/568, 599, 27, 707; 348/771, 345, 745; 372/39, 92, 96–99
  See application file for complete search history.

(56) References Cited

U.S. PATENT DOCUMENTS

| | | | | |
|---|---|---|---|---|
| 5,544,268 A * | 8/1996 | Bischel et al. | ..................... | 385/4 |
| 6,384,883 B1 * | 5/2002 | Ueda et al. | ..................... | 349/112 |
| 6,594,090 B2 * | 7/2003 | Kruschwitz et al. | ..................... | 359/707 |
| 6,950,454 B2 * | 9/2005 | Kruschwitz et al. | ..................... | 372/92 |
| 7,651,227 B2 * | 1/2010 | Penn et al. | ..................... | 353/102 |
| 2003/0202259 A1 * | 10/2003 | Nishimae et al. | ..................... | 359/726 |
| 2006/0221592 A1 * | 10/2006 | Nada et al. | ..................... | 362/29 |
| 2008/0143973 A1 * | 6/2008 | Wu | ..................... | 353/33 |
| 2008/0252970 A1 * | 10/2008 | Takahashi et al. | ..................... | 359/462 |
| 2008/0278693 A1 * | 11/2008 | Sawai | ..................... | 353/38 |
| 2009/0027625 A1 * | 1/2009 | Chen et al. | ..................... | 353/31 |
| 2009/0135376 A1 * | 5/2009 | Itoh et al. | ..................... | 353/31 |
| 2010/0220293 A1 * | 9/2010 | Mizushima et al. | ..................... | 353/20 |

FOREIGN PATENT DOCUMENTS

| | | |
|---|---|---|
| JP | 6-208089 A | 7/1994 |
| JP | 2003-98476 A | 4/2003 |
| JP | 2004-102132 A | 4/2004 |
| JP | 2008-268271 A | 11/2008 |

* cited by examiner

*Primary Examiner* — Georgia Y Epps
*Assistant Examiner* — Sultan Chowdhury
(74) *Attorney, Agent, or Firm* — Birch, Stewart, Lolasch & Birch, LLP

(57) ABSTRACT

A projection-type display apparatus that projects an image on a screen and performs image display includes at least one laser source that emits a coherent light beam, an illuminating optics that propagates the light beam emitted from the laser source into a predetermined optical path to guide the light beam to the screen, a reflective optical modulator that forms the image to be displayed on the screen on an illuminated surface illuminated by the light beam guided by the illuminating optics, and a projection optics that magnifies and projects the image formed on the illuminated surface of the reflective optical modulator on the screen. The illuminating optics includes a diffusion device, which diffuses the propagated light beam, and is arranged on a light propagation path near a conjugated position with the reflective optical modulator.

18 Claims, 6 Drawing Sheets

| POSITION OF DIFFUSION UNIT | SCINTILLATION |
|---|---|
| NON-ARRANGEMENT | × |
| NEAR INCIDENT SURFACE 41a OF LIGHT INTENSITY EQUALIZING DEVICE 41 | △ |
| NEAR EXIT SURFACE 41b OF LIGHT INTENSITY EQUALIZING DEVICE 41 | ○ |
| NEAR DIAPHRAGM POSITION 45 OF ILLUMINATING OPTICS 4A | △ |

PROJECTION-TYPE DISPLAY APPARATUS

BACKGROUND OF THE INVENTION

1. Field of the Invention

The present invention relates to a projection-type display apparatus that projects and displays an image on a screen.

2. Description of the Related Art

The recent trend is to provide a high-brightness light source in order to realize high brightness in a projection-type display apparatus, in which a liquid crystal panel or a reflective optical modulator (a reflective liquid crystal display or the like) is employed as an image displaying device.

An extra-high pressure mercury lamp, a metal halide lamp, or the like has been used as a light source for the projection-type display apparatus. Because these types of lamps have a shorter lifetime, a maintenance work to replace them is required frequently. Furthermore, when these types of lamps are employed, an optical system that takes out red, green, and blue from white light of the lamp is required. Thus, the configuration of the apparatus is complicated and the light use efficiency deteriorates.

To solve these problems, a laser source, such as a semiconductor laser, has been tried to be used as a light source. The laser source has a longer lifetime and does not require a maintenance work for a long time. Moreover, because the laser source can be directly modulated in accordance with an image to be displayed, the configuration is simplified and the light use efficiency is improved. In addition, a color reproduction range can be widened by employing the laser source.

A laser source has a high coherence. Therefore, when a laser source is adopted as a light source in a projection-type display apparatus, a light diffusing material within a transmission-type screen interferes with light and thus the displayed image glares (speckle noise or scintillation). Such interference leads to degradation of the picture quality. Thus, when the projection-type display apparatus employs a laser source, it is important to reduce the scintillation and speckle noise. A method for reducing scintillation and speckle noise has been proposed, in which a diffusion device is rotated in an optical system (see Japanese Patent Application Laid-open No. H6-208089).

When the projection-type display apparatus that employs a laser source rotates a diffusion device in an optical system to reduce scintillation, frosted glass or the like is used for the diffusion device (diffused plate). However, the conventional art described above does not specifically suggest the configuration and operation of the diffusion device, for example, where the diffused plate is arranged in the optical system or how the diffused plate is rotated. Consequently, there is a problem in that the light use efficiency is degraded.

SUMMARY OF THE INVENTION

According to an aspect of the present invention, there is provided a projection-type display apparatus that projects an image on a screen to perform image display, the projection-type display apparatus including at least one light source that emits a coherent light beam; an illuminating optics that propagates the light beam emitted from the light source into a predetermined optical path to guide the light beam to the screen; a light valve that forms the image to be displayed on the screen in an illuminated area that is illuminated by the light beam guided by the illuminating optics; and a projection optics that magnifies and projects the image, which is formed in the illuminated area of the light valve, onto the screen, wherein the illuminating optics includes a first diffusion unit that diffuses the propagated light beam and is arranged on a light propagation path near a conjugated position, at which the first diffusion unit is conjugated with the light valve.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be described in detail below with reference to the accompanying drawings. However, the present invention is not limited to these embodiments.

Figure 1:
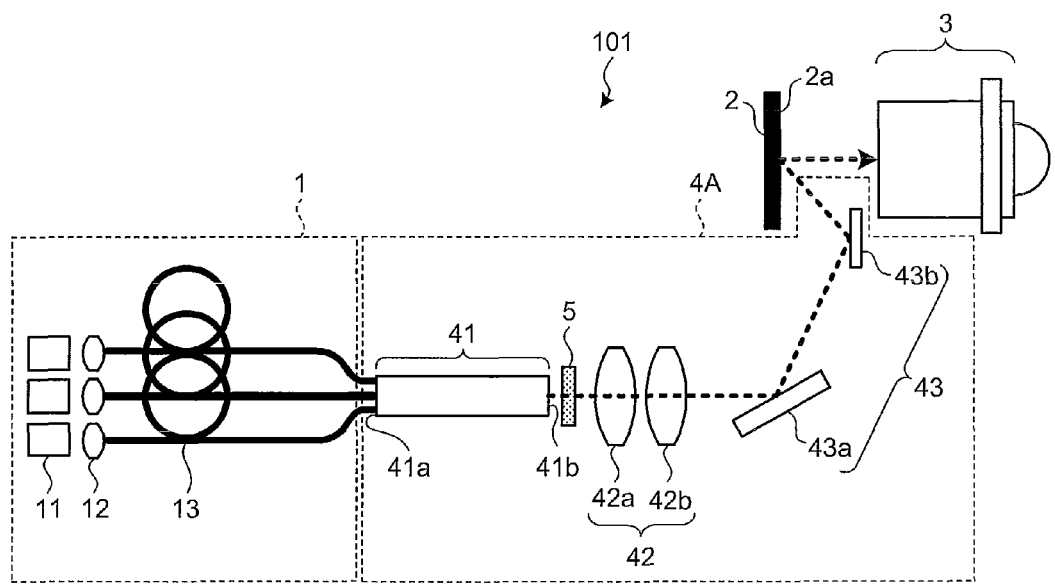
FIG. 1 is a diagram showing a configuration of a projection-type display apparatus according to a first embodiment.

FIG. 1 is a diagram showing a configuration of a projection-type display apparatus 101 according to first embodiment of the present invention. The projection-type display apparatus 101 is a rear-projection type image displaying apparatus that projects an image on a screen using a light valve.

As illustrated in FIG. 1, a projection-type display apparatus 101 according to a first embodiment includes a condensing optics 1, an illuminating optics 4A, a reflective optical modulator (a reflecting light valve) 2 that acts as an image displaying device, and a projection optics 3 that projects an image on an illuminated surface (an image forming area) 2a of the reflective optical modulator 2 illuminated by the illuminating optics 4A onto a screen (not shown).

The condensing optics 1 includes laser sources 11 corresponding to a plurality of colors (three colors in FIG. 1), a plurality of condenser lenses (condensing units) 12 (three lenses in FIG. 1) each condenses a light beam emitted from the laser source 11 using one or more lenses or mirrors, and a plurality of optical fibers 13 (three fibers in FIG. 1) each guides the light beam emitted from the condenser lens 12 to the illuminating optics 4A.

In the condensing optics 1, one condenser lens 12 and one optical fiber 13 correspond to one laser source 11. The laser beams emitted from the respective laser sources 11 are guided to the illuminating optics 4A via the condenser lenses 12 and the optical fibers 13 corresponding to the respective laser sources 11.

The illuminating optics 4A includes a light intensity equalizing device 41 that equalizes intensity distribution of the light flux emitted from the condensing optics 1 (the optical fibers 13), a diffusion device 5, a relay lens group 42 that has lenses 42a and 42b, and a mirror group 43 that has a first mirror 43a and a second mirror 43b. The illuminating optics 4A guides the light flux emitted from the light intensity equalizing device 41 to the reflective optical modulator 2 using the relay lens group 42 and the mirror group 43.

The light intensity equalizing device 41 has a function for equalizing the light intensity of the light flux emitted from the condensing optics 1 (for example, a function for reducing unevenness of illuminance). The light intensity equalizing device 41 is arranged in the illuminating optics 4A such that an incident surface (an incident end surface) 41a of the light intensity equalizing device 41 that is an entrance of light is directed to the optical fiber 13 and an exit surface (an exit end surface) 41b that is an exit of light is directed to the relay lens group 42.

The light intensity equalizing device 41 is formed of transparent material such as glass or resin. The light intensity equalizing device 41 may be formed into a polygonal pillar-shaped rod (a pillar-shaped member that has a polygonal shape in cross section), of which the inner side of the side wall is a total reflecting surface. Alternatively, the light intensity equalizing device 41 may be formed into a pipe (a tube-shaped member), which has a polygonal shape in cross section. The pipe can be formed by connecting pipe members, of which the inner side is a light reflection surface.

When the light intensity equalizing device 41 is in the form of a polygonal pillar-shaped rod, the light intensity equalizing device 41 reflects light plural times and then emits the light from the exit surface 41b by using total-reflection on the interface between the transparent material and atmosphere. When the light intensity equalizing device 41 is in the form of a polygonal pipe, the light intensity equalizing device 41 reflects light plural times and then emits the light from the exit surface 41b by using reflection on a mirror surface that is directed inward.

The light intensity equalizing device 41 has such an appropriate length in a traveling direction of the light flux that the light reflected inside plural times is irradiated and overlapped in the vicinity of the exit surface 41b of the light intensity equalizing device 41. As a result, a substantially uniform intensity distribution is obtained in the neighborhood of the exit surface 41b of the light intensity equalizing device 41. The outgoing light that has the substantially uniform intensity distribution and is output from the exit surface 41b is guided to the reflective optical modulator 2 via the relay lens group 42 and the mirror group 43 and then illuminate the illuminated surface 2a of the reflective optical modulator 2.

The diffusion device 5 diffuses the light, which propagates through the light intensity equalizing device 41, and sends the light to the relay lens group 42 to reduce a speckle. The diffusion device 5 may be a holographic diffusion device that can set the diffusion angle of light using hologram patterns provided on a substrate. In the present embodiment, the diffusion device 5 is arranged in neighborhood of the exit surface 41b of the light intensity equalizing device 41 (on a light propagation path in the neighborhood of the exit surface 41b).

The reflective optical modulator 2 may be a DMD (registered trademark) (Digital Micro-mirror Device). The reflective optical modulator 2 is obtained by arraying mobile micro-mirrors (for example, hundreds of thousands of pieces) corresponding to pixels in a planar manner and is configured to change the tilt of each micro-mirror in accordance with pixel information.

When a surface on which micro-mirrors are arranged (surface of the substrate on which micro-mirrors are formed) is taken as a reference surface, the reflective optical modulator 2 inclines the micro-mirror in a constant direction to the reference surface at a predetermined angle $\alpha$ (for example, 12 degrees) to reflect the incident light flux toward the projection optics 3. The light flux incident on the projection optics 3 is utilized for image projection on the screen (not shown).

Furthermore, the reflective optical modulator 2 inclines the micro-mirror in the constant direction to the reference surface at a predetermined angle $\beta$ (for example, $-12$ degrees) to reflect the incident light flux toward a light absorbing plate (not shown). The light flux incident on the light absorbing plate is not utilized for image projection on the screen.

Although the relay lens group 42 is formed of two lenses 42a and 42b in the present embodiment, the number of lenses forming the relay lens group 42 is not limited to two. The relay lens group 42 can be formed of one lens, or three or more lenses. Similarly, although the mirror group 43 is formed of two mirrors of the first and second mirrors 43a and 43b, the number of mirrors of the mirror group 43 is not limited to two. The mirror group 43 can be formed of one lens, or three or more lenses.

Figure 2:
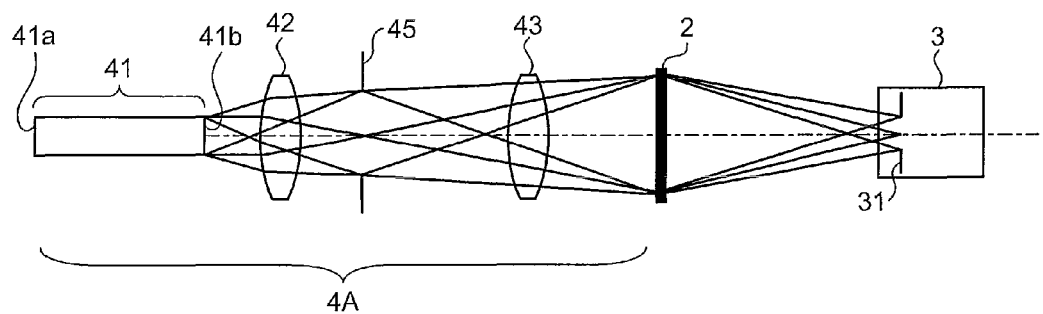
FIG. 2 is a diagram showing a concept of light propagation of an illuminating optical system.

Now, light propagation in the illuminating optics 4A is described. FIG. 2 is a diagram showing how light propagates in the illuminating optics. FIG. 2 conceptually illustrates a diaphragm position of the illuminating optics of the first embodiment. In FIG. 2, a case where the relay lens group 42 and the mirror group 43 are respectively realized as one lens element is illustrated as an example of the illuminating optics 4A.

In the present embodiment, the illuminating optics 4A is configured such that the exit surface 41b of the light intensity equalizing device 41 and the illuminated surface 2a of the reflective optical modulator 2 are optically conjugated with each other. In the illuminating optics 4A, the position conjugated with an incidence-side aperture 31 of the projection optics 3 is a diaphragm position 45 of the illuminating optics 4A. The diaphragm position 45 of the illuminating optics 4A is a position at which key light emitted from the light intensity equalizing device 41 is substantially condensed. The position is conjugated with the incidence-side aperture 31 of the projection optics 3 and conjugated with the incident surface 41a of the light intensity equalizing device 41. For this reason, the diaphragm position 45 is a position at which a trouble such as lack of a part of image is hard to occur even if part of the light flux is cut there. In the present embodiment, the illuminating optics 4A is configured such that the diaphragm position 45 of the illuminating optics 4A is present between the relay lens group 42 and the mirror group 43.

Next, a method for changing a speckle pattern, which is generated in case of adopting a light source such as a laser source that emits coherent light, by using the diffusion effect of the diffusion device 5 in order to reduce a speckle will be described.

In the present embodiment, a speckle is efficiently reduced by arranging the diffusion device 5 at an appropriate position. Because the projection optics 3 is an imaging optics, the blurring of an image becomes large when the diffusion device 5 is arranged in the projection optics 3. Thus, it is not appropriate to arrange the diffusion device 5 in the projection optical system 3. In the present embodiment, the diffusion device 5 is arranged in the illuminating optics 4A.

Figures 3, 4:
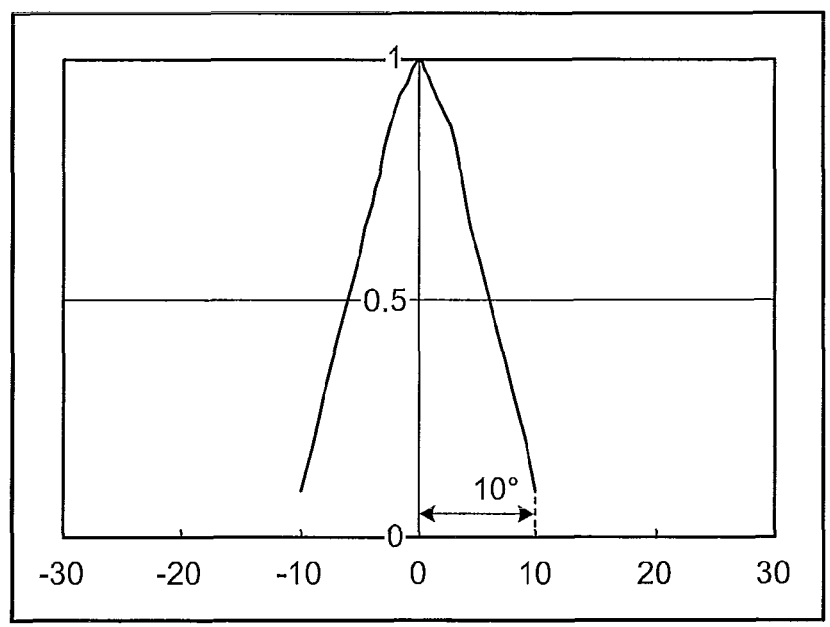
FIG. 3 is a diagram showing an example of a display result of a display image corresponding to the arrangement position of a diffusion device.
FIG. 4 is a diagram showing the diffusion characteristic of the diffusion device.

FIG. 3 is a diagram showing an example of a display result of a display image corresponding to the arrangement position of the diffusion device. In FIG. 3, an example of a result (the decreasing effect of scintillation) obtained by experimentally verifying each display image is illustrated when the diffusion device 5 is arranged on the incident surface 41a of the light intensity equalizing device 41, on the exit surface 41b of the light intensity equalizing device 41, ant at the diaphragm position 45 of the illuminating optics 4A. When the diffusion device 5 is not arranged in the illuminating optics 4A, scintillation strongly occurs in this experimental system. In FIG. 3, it is expressed with "X" when scintillation is strongly generated (strong scintillation). Moreover, in FIG. 3, weak scintillation is expressed with "O" when scintillation is efficiently reduced. Furthermore, the intensity of scintillation between strong scintillation and weak scintillation is expressed with "Δ" (middle scintillation).

The diffusion device 5 is referred to as a holographic diffusion device and a diffusion angle of light can be set by using hologram patterns formed on the substrate. FIG. 4 is a diagram showing the diffusion characteristic of the diffusion device used for the present experiment. In FIG. 4, the diffusion characteristic of the diffusion device is schematically illustrated. As illustrated in FIG. 4, the diffusion device 5 can obtain diffusion characteristic such that light spreads by about 10 degrees at one side when parallel light is incident thereon.

As described with reference to FIG. 2, the incident surface 41a of the light intensity equalizing device 41 and the diaphragm position 45 of the illuminating optics 4A are conjugated with the incidence-side aperture 31 of the projection optical system 3. Moreover, the exit surface 41b of the light intensity equalizing device 41 is conjugated with the illuminated surface 2a of the reflective optical modulator 2.

As can be appreciated from the experimental result illustrated in FIG. 3, among the cases where the same diffusion device 5 is arranged at three different positions, it turns out that the case where the diffusion device 5 is arranged on the exit surface 41b of the light intensity equalizing device 41 that is conjugated with the illuminated surface 2a of the reflective optical modulator 2 has the highest scintillation decreasing effect. Specifically, when the diffusion device 5 is arranged on the exit surface 41b of the light intensity equalizing device 41, it can be determined that the scintillation decreasing effect is "O". When the diffusion device 5 is arranged at the entrance surface 41a of the light intensity equalizing device 41 or the diaphragm position 45 of the illuminating optics 4A, it is determined that the scintillation decreasing effect is "Δ" because the scintillation decreasing effect is present and some amount of unevenness is left.

In the present experiment, an effect is verified when the diffusion device 5 is arranged on the exit surface 41b of the light intensity equalizing device 41. When rotating or vibrating the diffusion device 5, the scintillation decreasing effect increases.

In the present embodiment, antireflection coating can be performed on the surface of the diffusion device 5. With this, the loss of brightness caused by the surface reflection on the diffusion device 5 can be reduced. Thus, it is possible to obtain an optical system that has small brightness loss and good efficiency.

In the present embodiment, it has been described about the case where a holographic diffusion device is adopted as the diffusion device 5. The configuration of the diffusion device 5 is not limited to this. For example, similarly to the case where a holographic diffusion device is adopted as the diffusion device 5, the same effect can be obtained by adopting a diffusion device (a scattering member) that diffuses (scatters) image light by coating bead-shaped particles on its surface or by adopting frosted glass as the diffusion device 5.

In the present embodiment, it has been described about the case where the light intensity equalizing device 41 is made up of a polygonal pillar-shaped member or a tube-shaped member. However, the configuration of the light intensity equalizing device 41 is not limited to this. For example, the light intensity equalizing device 41 can be made up of a lens array that is obtained by arraying a plurality of lens elements in a planar manner. Moreover, the diffusion device 5 can be made up of a lens array that is obtained by arraying a plurality of lens elements in a planar manner.

In the present embodiment, it has been described about the case where a reflective optical modulator such as a DMD (registered trademark) device is used as a light valve (the reflective optical modulator 2). Alternatively, a transmission-type liquid crystal display, a reflecting liquid crystal display, a liquid crystal panel, and the like other than the DMD (registered trademark) device can be adopted as a light valve.

Thus, because the diffusion device 5 is arranged in the vicinity of the exit surface 41b of the light intensity equalizing device 41, an area of the incident surface and the exit surface of the diffusion device 5 can be reduced. As a result, scintillation can be reduced efficiently and at low cost. Therefore, scintillation can be reduced with high efficiency and with a simple configuration, and a good-quality image can be displayed.

Furthermore, when the diffusion device 5 is configured with a holographic diffusion device, scintillation can be efficiently reduced. When the diffusion device 5 is configured with a scattering member that scatters image light, scintillation can be reduced at low cost. When the diffusion device 5 is configured with frosted glass, an optical system that has high heat resistance can be obtained. In addition, when antireflection coating is performed on the diffusion device 5, the loss of brightness caused by the surface reflection of the diffusion device 5 is reduced and thus image display can be efficiently performed.

Moreover, scintillation can be efficiently reduced by making up the diffusion device 5 of a lens array. Furthermore, the intensity distribution of illumination light flux in a cross section can be made uniform and the unevenness of illuminance can be suppressed by making up the light intensity equalizing device 41 of a lens array.

Because the light source of the projection-type display apparatus 101 is configured with the laser source 11, it is possible to obtain a bright optical system that has a long lifetime and good color reproducibility. Moreover, because it is configured such that the light flux emitted from the laser source 11 is guided through the optical fiber 13, it is possible to arrange an optical system with high flexibility and obtain an optical system that has high light-flux taking-in efficiency. Furthermore, because the light flux is reflected multiple times within the optical fiber 13, scintillation can be reduced and thus a high-uniformity image can be obtained.

When the light intensity equalizing device 41 is made up of tube-shaped member such that the light flux is reflected on the inner surface, the light intensity equalizing device 41 is hard to be heated due to illumination light flux. With this, the cooling and maintenance of the light intensity equalizing device 41 become easy. Moreover, because the light intensity equalizing device 41 is made up of polygonal pillar-shaped member formed of transparent materials, the designing of the light intensity equalizing device 41 becomes easy.

Thus, according to the first embodiment, because a diffusion unit (the diffusion device 5) is arranged on a light propagation path near a conjugated position with a light valve (the reflective optical modulator 2) in the illuminating optics 4A, the size of the diffusion device 5 can be reduced, the degradation of light use efficiency can be suppressed, and scintillation can be reduced. Therefore, an optical system capable of displaying a good-quality image efficiently at low costs can be obtained. Also, the size of the optical system can be easily reduced.

Second Embodiment

Next, the second embodiment of the present invention will be described with reference to FIG. 5 to FIG. 9. In the first embodiment, the diffusion device 5 is arranged in the vicinity of the exit surface 41b of the light intensity equalizing device 41 in order to reduce scintillation. In the second embodiment, in addition to the above configuration, a diffusion device 51 is further arranged on the incident surface 41a of the light intensity equalizing device 41 that is conjugated with the incidence-side aperture 31 of the projection optics 3.

Figure 5:
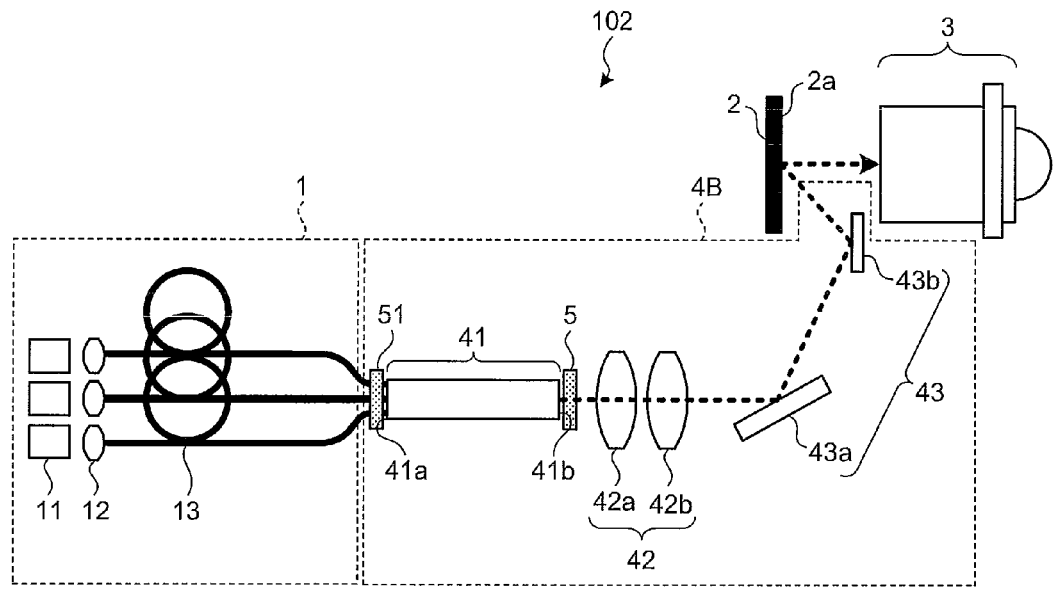
FIG. 5 is a diagram showing a configuration of a projection-type display apparatus according to a second embodiment.

FIG. 5 is a diagram showing a configuration of a projection-type display apparatus 102 according to the second embodiment of the present invention. Among components illustrated in FIG. 5, the components for achieving the same function as the projection-type display apparatus 101 of the first embodiment illustrated in FIG. 1 have the same numbers as in FIG. 1, and overlapping description is omitted.

An illuminating optics 4B further includes a diffusion device 51 in addition to the configuration of the illuminating optics 4A. The diffusion device 51 is a device having the same function and configuration as those of the diffusion device 5. In the projection-type display apparatus 102 of the present embodiment, the diffusion device 51 is arranged at the side of incident surface 41a (the neighborhood of the incident surface 41a) of the light intensity equalizing device 41 in the illuminating optics 4B.

The diffusion device 51 diffuses light emitted from the condensing optics 1 and sends the light to the light intensity equalizing device 41 in order to reduce a speckle. Moreover, in the present embodiment, the diffusion device 5 is arranged in the vicinity of the exit surface 41b of the light intensity equalizing device 41 similarly to the first embodiment. Thus, similarly to the projection-type display apparatus 101 in the first embodiment, the diffusion device 5 of the projection-type display apparatus 102 diffuses the light propagated via the light intensity equalizing device 41 and sends the light to the relay lens group 42 in order to reduce a speckle.

In FIG. 5, it has been described about the case where the diffusion device 51 is arranged at the side of incident surface 41a of the light intensity equalizing device 41 in the projection-type display apparatus 102. However, the diffusion device 51 can be arranged at another position (for example, the diaphragm position 45 of the illuminating optics 4B) that is different from the position near the incident surface 41a.

Figure 6:
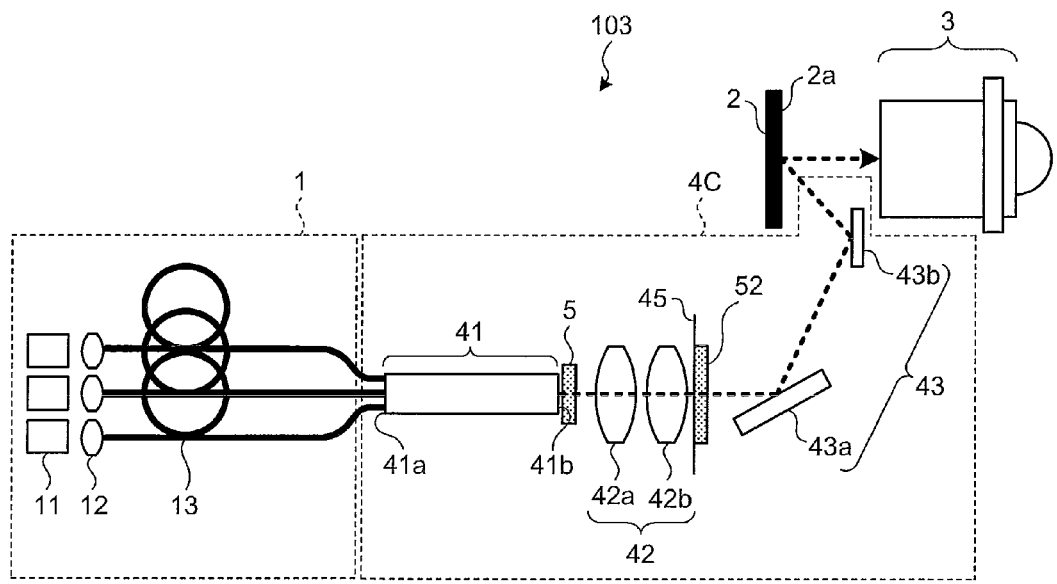
FIG. 6 is a diagram showing a configuration of the projection-type display apparatus when the diffusion device is arranged at the diaphragm position of the illuminating optical system.

FIG. 6 is a diagram showing a configuration of a projection-type display apparatus 103 when the diffusion device is arranged at the diaphragm position of the illuminating optics. Among components illustrated in FIG. 6, the components for achieving the same function as the projection-type display apparatus 101 in the first embodiment illustrated in FIG. 1 have the same numbers as in FIG. 1 and overlapping description is omitted.

The projection-type display apparatus 103 is configured such that the diaphragm position 45 of an illuminating optics 4C is near the relay lens group 42. The illuminating optics 4C further includes a diffusion device 52 in addition to the configuration of the illuminating optics 4A. In the projection-type display apparatus 103, the diffusion device 52 is arranged at the diaphragm position 45 of the illuminating optics 4C.

The diffusion device 52 is a device that has the same function and configuration as those of the diffusion device 5 or the diffusion device 51. The diffusion device 52 diffuses the light that has been propagated via the relay lens group 42 and sends the light to the mirror group 43 in order to reduce a speckle. Moreover, in the projection-type display apparatus 103, similarly to the projection-type display apparatus 102, the diffusion device 5 is arranged in the vicinity of the exit surface 41b of the light intensity equalizing device 41.

Figure 7:
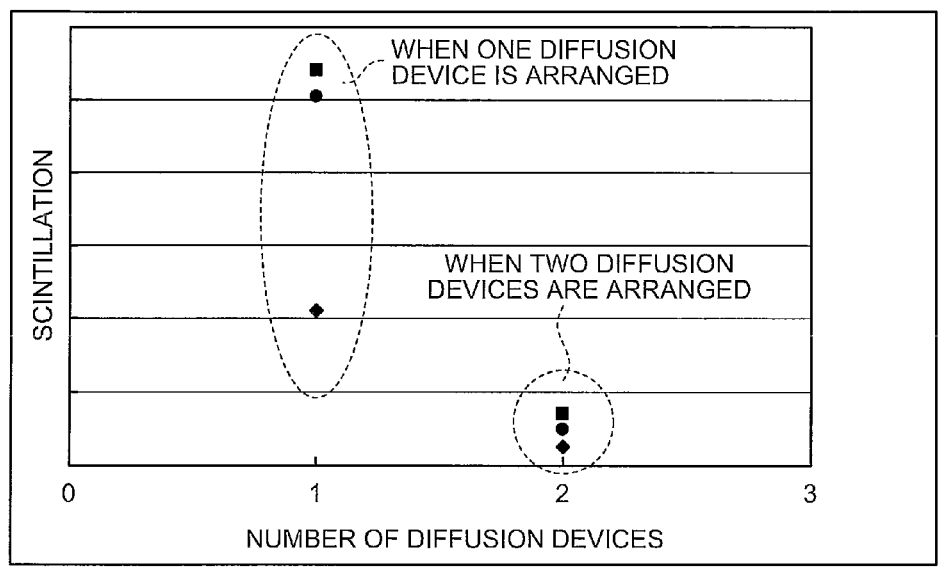
FIG. 7 is a diagram showing intensity of scintillation when two diffusion devices are arranged in the illuminating optical system.

Like the diffusion device 5 and the diffusion device 51 illustrated in FIG. 5 or the diffusion device 5 and the diffusion device 52 illustrated in FIG. 6, an effect obtained by arranging two diffusion devices in the illuminating optics 4B or the illuminating optics 4C is illustrated in FIG. 7. FIG. 7 is a diagram showing intensity of scintillation when two diffusion devices are arranged in the illuminating optics. In FIG. 7, intensity of scintillation when one diffusion device is arranged in the illuminating optics 4B (the illuminating optics 4C) (in the case of one diffusion device in FIG. 7) is illustrated, and intensity of scintillation when two diffusion devices are arranged in the illuminating optics 4B or the illuminating optics 4C (in the case of two diffusion devices in FIG. 7) is illustrated. In the present embodiment, three kinds of different diffusion devices are prepared and intensity of scintillation when using each of the diffusion devices is measured.

In the case of using one diffusion device, one kind of diffusion device among three kinds of diffusion devices is arranged near the exit surface 41b of the light intensity equalizing device 41 only. Moreover, in the case of using two diffusion devices, two kinds of diffusion devices among three kinds of diffusion devices are arranged at two positions; one kind of them is at the exit surface 41b of the light intensity equalizing device 41, and one kind of them is at the incident surface 41a of the light intensity equalizing device 41 or the diaphragm position 45 of the illuminating optics 4C. As illustrated in FIG. 7, when two diffusion devices are arranged, it turns out that scintillation is largely reduced compared with when one diffusion device is arranged.

Thus, the diffusion device 5 is arranged near the exit surface 41b of the light intensity equalizing device 41, which is conjugated with the illuminated surface 2a of the reflective optical modulator 2. And the diffusion device 51 or the diffusion device 52 is further arranged at the incident surface 41a of the light intensity equalizing device 41 or at the diaphragm position 45 of the illuminating optics 4C that are conjugated with the incidence-side aperture 31 of the projection optics 3. With this, a scintillation decreasing effect is largely increased.

Instead of arranging the diffusion device 52 at the diaphragm position 45 of the illuminating optics 4C, at least one surface of surfaces of lens elements, which make up the relay lens group 42 of the illuminating optics 4B (the illuminating optics 4C), can be roughened. In other words, the roughened lens surface among lens elements making up the relay lens group 42 can be a diffusion unit.

Figure 8:
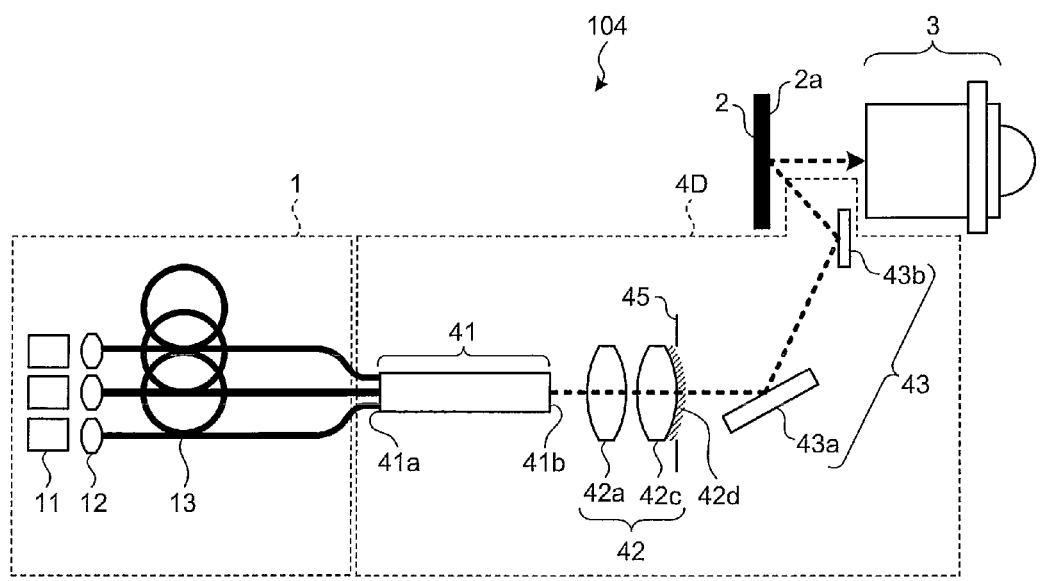
FIG. 8 is a diagram showing a configuration of the projection-type display apparatus when the surface of at least one side of lens elements making up a relay lens group is roughened.

FIG. 8 is a diagram showing the configuration of a projection-type display apparatus 104 when at least one surface of surfaces of lens elements making up the relay lens group is roughened. Among components illustrated in FIG. 8, the components for achieving the same function as the projection-type display apparatus 101 of the first embodiment illustrated in FIG. 1 have the same numbers as in FIG. 1 and overlapping description is omitted.

An illuminating optics 4D of the projection-type display apparatus 104 includes the relay lens group 42 that is configured of lenses 42a and 42c. In the projection-type display apparatus 104, the diaphragm position 45 of the illuminating optics 4D is near an exit surface 42d of the lens 42c. Because the diaphragm position 45 of the illuminating optics 4D is near the exit surface 42d of the lens 42c in the projection-type display apparatus 104 in FIG. 8, the exit surface 42d of the lens 42c is roughened, in the present embodiment. In other words, in the projection-type display apparatus 104, the exit surface of the lens positioned near the diaphragm position 45 of the illuminating optics 4D is roughened. In addition, the diffusion device 5 can be arranged in the illuminating optics 4D of the projection-type display apparatus 104 similarly in the illuminating optics 4C of the projection-type display apparatus 103.

Thus, by roughening at least one surface of the surfaces of lens elements making up the relay lens group 42 of the illuminating optics 4D instead of arranging the diffusion device 52 in the illuminating optics 4C, it is possible to obtain the same effect as in the case where the diffusion device 52 is arranged.

Moreover, because the exit surface 42d of the lens 42c is roughened, the diffusion device 52 does not have to be arranged. With this the loss of light flux caused by the surface reflection on the diffusion device 52 disappears and scintillation can be efficiently reduced.

In addition, instead of arranging the diffusion device 52 at the diaphragm position 45 of the illuminating optics 4C, a diffusion film can be attached on the exit surface of the lens 42b. Even when a diffusion film is attached on the exit surface of the lens 42b, the same effect can be obtained as in the case where the diffusion device 52 is arranged. Also in this case, because the diffusion device does not have to be arranged, the loss of light flux caused by the surface reflection on the diffusion device 52 disappears and thus scintillation can be efficiently reduced.

Figure 9:
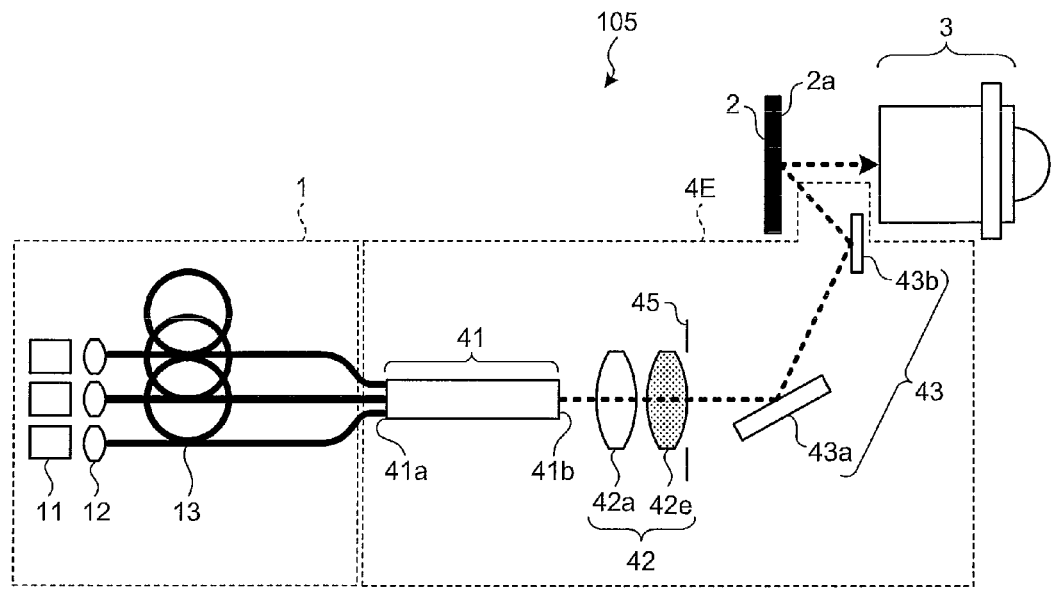
FIG. 9 is a diagram showing a configuration of the projection-type display apparatus when at least one of lens elements making up the relay lens group is formed of frosted glass.

Moreover, the lens 42b can be formed of plastic material that contains frosted glass or diffusing material. FIG. 9 is a diagram showing the configuration of a projection-type display apparatus 105 when at least one of lens elements making up a relay lens group is formed of plastic material that contains frosted glass or diffusing material. Among components illustrated in FIG. 9, the components for achieving the same function as the projection-type display apparatus 101 of the first embodiment illustrated in FIG. 1 have the same numbers as in the FIG. 1 and overlapping description is omitted.

An illuminating optics 4E of the projection-type display apparatus 105 includes the relay lens group 42 that consists of lenses 42a and 42e. In the projection-type display apparatus 105, the diaphragm position 45 of the illuminating optics 4E is near the lens 42e. Because the diaphragm position 45 of the illuminating optics 4E is near the lens 42e in the projection-type display apparatus 105 illustrated in FIG. 9, the lens 42e is formed of plastic material that contains frosted glass or diffusing material.

Thus, even when the lens 42e is formed of plastic material that contains frosted glass or diffusing material, it is possible to obtain the same effect as in the case when the diffusion device 52 is arranged. Also in this case, because the diffusion device does not have to be arranged, the loss of light flux caused by the surface reflection on the diffusion device 52 disappears and thus scintillation can be efficiently reduced.

Thus, according to the second embodiment, because the diffusion device 5 is arranged in the vicinity of the exit surface 41b, which is conjugated with the illuminated surface 2a of the reflective optical modulator 2, of the light intensity equalizing device 41 and the diffusion device 51 is arranged at the incident surface 41a, which is conjugated with the incidence-side aperture 31 of the projection optics 3, of the light intensity equalizing device 41, scintillation can be largely reduced.

Moreover, because the diffusion device 5 is arranged near the exit surface 41b, which is conjugated with the illuminated surface 2a of the reflective optical modulator 2, of the light intensity equalizing device 41 and the diffusion device 52 is arranged at the diaphragm position 45, which is conjugated with the incidence-side aperture 31 of the projection optics 3, of the illuminating optics 4C, scintillation can be largely reduced.

Third Embodiment

Next, third embodiment of the present invention will be described with reference to FIG. 10. In the second embodiment, the diffusion device 52 is arranged in the vicinity of the diaphragm position 45 of the illuminating optical system 4C to reduce scintillation. In the third embodiment, at least one surface of surfaces of mirror elements making up the mirror group 43 is roughened when the diaphragm position 45 of the illuminating optics 4F is near the mirror group 43. In other words, among mirror elements making up the mirror group 43, roughened mirror surface is used as a diffusion unit.

Figure 10:
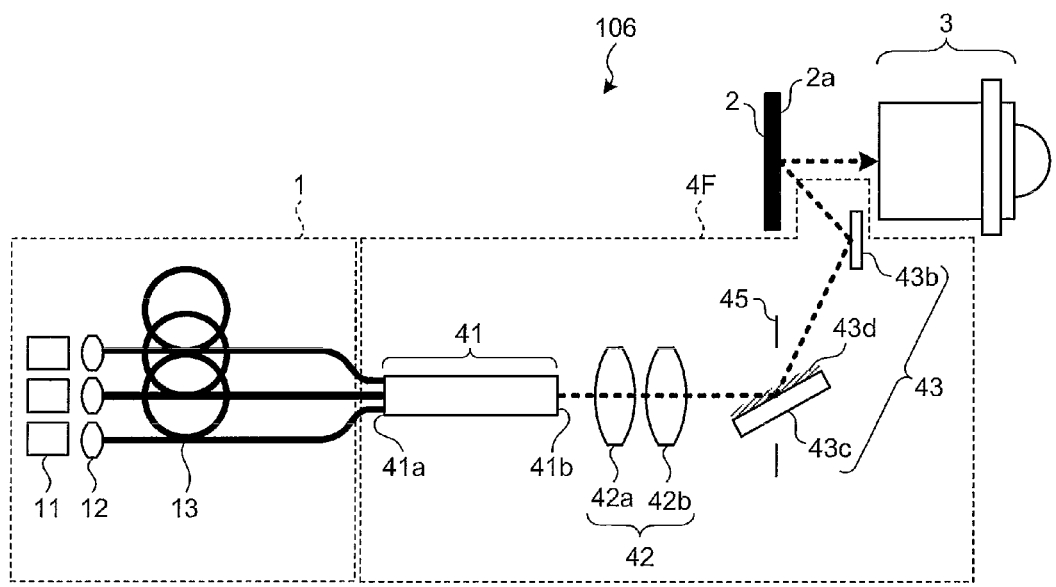
FIG. 10 is a diagram showing a configuration of a projection-type display apparatus according to a third embodiment.

FIG. 10 is a diagram showing a configuration of a projection-type display apparatus 106 according to the third embodiment of the present invention. Among components illustrated in FIG. 10, the components for achieving the same function as the projection-type display apparatus 101 of the first embodiment illustrated in FIG. 1 have the same numbers as in FIG. 1 and overlapping description is omitted.

An illuminating optics 4F of the projection-type display apparatus 106 includes the mirror group 43 that is made up of first mirror 43c and second mirror 43b. The first mirror 43c has the same configuration as the first mirror 43a, and a reflecting surface 43d thereof is roughened. The projection-type display apparatus 106 is configured such that the diaphragm position 45 of the illuminating optics 4F is near the mirror group 43 (in the vicinity of the reflecting surface 43d of the first mirror 43c of the mirror group 43 in FIG. 10). Because the diaphragm position 45 of the illuminating optics 4F is positioned within the mirror group 43 in the projection-type display apparatus 106 illustrated in FIG. 10, the vicinity surface (the reflecting surface 43d of the first mirror 43c) of the mirror group 43 is roughened.

Thus, because the reflecting surface 43d of the first mirror 43c is roughened, the present embodiment can obtain the same effect as in the case where the diffusion device 52 is arranged. Also in this case, because the diffusion device 52 does not have to be arranged, the loss of light flux caused by the surface reflection on the diffusion device 52 disappears and thus scintillation can be efficiently reduced.

Thus, according to the third embodiment, because at least one surface of surfaces of mirror elements making up the mirror group 43 is roughened when the diaphragm position 45 of the illuminating optics 4F is near the mirror group 43, scintillation can be largely reduced.

Fourth Embodiment

Next, fourth embodiment of the present invention is described with reference to FIG. 11. In the first embodiment, the diffusion device 5 is arranged in the illuminating optics 4A. In the fourth embodiment, at least one of the incident surface and the exit surface of a light intensity equalizing device is roughened.

Figure 11:
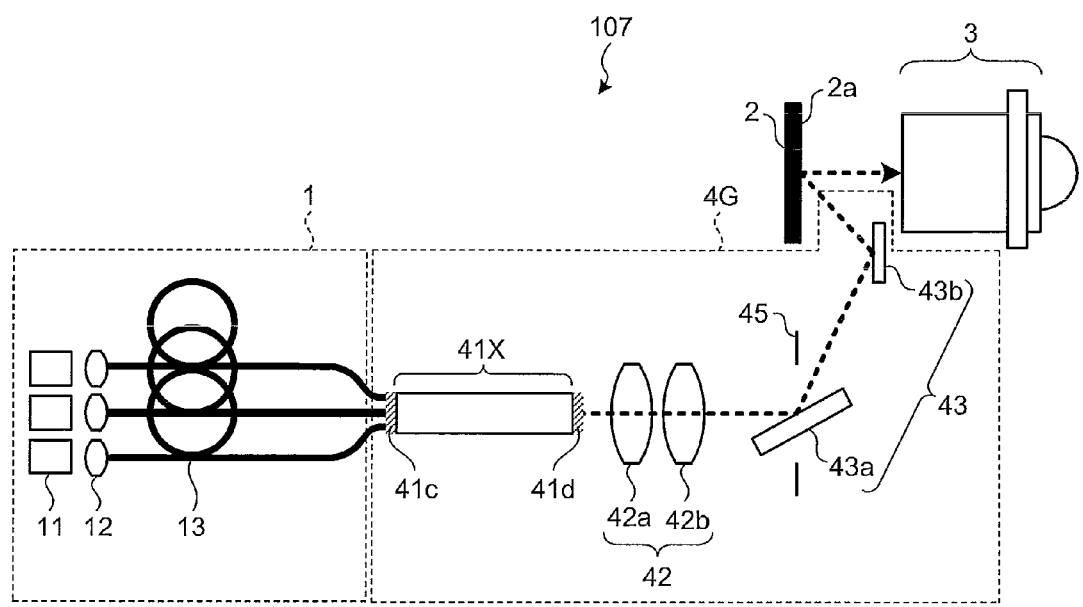
FIG. 11 is a diagram showing a configuration of a projection-type display apparatus according to a fourth embodiment.

FIG. 11 is a diagram showing a configuration of a projection-type display apparatus 107 according to the fourth embodiment of the present invention. Among components illustrated in FIG. 11, the components for achieving the same function as the projection-type display apparatus 101 of the first embodiment illustrated in FIG. 1 have the same numbers as in FIG. 1 and overlapping description is omitted.

An illuminating optics 4G of the projection-type display apparatus 107 includes a light intensity equalizing device 41X instead of the light intensity equalizing device 41. The light intensity equalizing device 41X is arranged in the illuminating optics 4G such that an incident surface 41c for light faces to the optical fiber 13 and an exit surface 41d for light faces to the relay lens group 42. Furthermore, one of the incident surface 41c and the exit surface 41d is roughened or both of these surfaces are roughened.

Thus, because at least one of the incident surface 41c and the exit surface 41d of the light intensity equalizing device 41X is roughened, the present embodiment can obtain the same effect as in the case where at least one of the diffusion device 51 and the diffusion device 5 is arranged.

Moreover, the diffusion device 51 or the diffusion device 5 does not have to be arranged because at least one of the incident surface 41c and the exit surface 41d of the light intensity equalizing device 41X is roughened, the loss of light flux caused by the surface reflection on the diffusion device 51 and the diffusion device 5 disappears, thus scintillation can be efficiently reduced.

Thus, according to the fourth embodiment, because at least one of the incident surface 41c and the exit surface 41d of the light intensity equalizing device 41X is roughened, scintillation can be largely reduced.

In addition, above described embodiments are not limited to the case in which antireflection coating is performed on the surface of the diffusion device 5. Antireflection coating can be performed on the surfaces of the diffusion devices 51 and 52 and the diffusion unit (the roughened exit surface 42d, the lens 42e, the roughened reflecting surface 43d, the roughened incident surface 41c, and the roughened exit surface 41d) that are described in any of the second to fourth embodiments. Thus, because the loss of brightness caused by surface reflection can be reduced, it is possible to obtain an optical system that the loss of brightness is small and the efficiency is good.

In this case, the diffusion device 5 and the roughened exit surface 41d described in any of the first to fourth embodiments correspond to a first diffusion unit described in Claims. The diffusion devices 51 and 52, the roughened exit surface 42d, the lens 42e, the roughened reflecting surface 43d, and the roughened incident surface 41c described in any of the first to the fourth embodiments correspond to a second diffusion unit described in Claims.

As described above, according to an aspect of the present invention, because the first diffusion unit that diffuses the propagated light flux is arranged on the light propagation path near the conjugated position with the light valve, it is possible to efficiently reduce scintillation and to achieve good picture quality.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A projection-type display apparatus that projects an image onto a screen to perform image display, the projection-type display apparatus comprising:
   at least one light source that emits a coherent light;
   an illuminating optics that propagates a light flux emitted from the light source on a predetermined optical path to guide the light flux to the screen;
   a light valve that forms the image to be displayed on the screen in an illuminated area that is illuminated by the light flux guided by the illuminating optics; and
   a projection optics that magnifies and projects the image, which is formed in the illuminated area of the light valve, onto the screen, wherein
   the illuminating optics comprising a first diffusion unit that diffuses the propagated light flux and is arranged on the optical path near a conjugated position with the light valve, and
   a light intensity equalizing device that equalizes intensity distribution of the light flux emitted from the light source, and
   a conjugated position with the light valve is near an exit surface of the light intensity equalizing device.

2. The projection-type display apparatus according to claim 1, wherein
   the illuminating optics further comprises a second diffusion unit that diffuses the propagated light flux and is arranged on the optical path near a conjugated position with an incidence-side aperture of the projection optics.

3. The projection-type display apparatus according to claim 1, wherein
   a conjugated position with an incidence-side aperture of the projection optics is near an incident surface of the light intensity equalizing device.

4. The projection-type display apparatus according to claim 2, wherein
   the illuminating optics comprises a light intensity equalizing device that equalizes intensity distribution of the light flux emitted from the light source, and a relay lens group and a mirror group that guide the light flux emitted from the light intensity equalizing device to the light valve, and
   the conjugated position with the incidence-side aperture of the projection optics is located near the relay lens group or the mirror group.

5. The projection-type display apparatus according to claim 2, wherein at least one of the first and second diffusion units comprises a holographic diffusion device.

6. The projection-type display apparatus according to claim 2, wherein at least one of the first and second diffusion unit is a scattering member that scatters the light flux.

7. The projection-type display apparatus according to claim 2, wherein at least one of the first and second diffusion units is formed of frosted glass.

8. The projection-type display apparatus according to claim 2, wherein at least one of the first and second diffusion units comprises a lens array, in which a plurality of lens elements is arrayed in a planar manner.

9. The projection-type display apparatus according to claim 1, wherein at least one of the first and second diffusion units comprises at least one roughened surface of surfaces of the incident surface and the exit surface of the light intensity equalizing device.

10. The projection-type display apparatus according to claim 4, wherein the second diffusion unit comprises at least one roughened surface of lens surfaces of the relay lens group.

11. The projection-type display apparatus according to claim 4, wherein the second diffusion unit is configured with at least one of lenses of the relay lens group.

12. The projection-type display apparatus according to claim 4, wherein the second diffusion unit comprises at least one diffusion film attached on at least one surface of lens surfaces of the relay lens group.

13. The projection-type display apparatus according to claim 4, wherein the second diffusion unit comprises at least one roughened surface of mirror surfaces of the mirror group.

14. The projection-type display apparatus according to claim 2, wherein at least one of the first and second diffusion units comprises an antireflection coating on its surface.

15. The projection-type display apparatus according to claim 1, wherein the light source is a laser source.

16. The projection-type display apparatus according to claim 1, wherein the light intensity equalizing device comprises a tube-shaped member that reflects the light flux on an inner surface thereof.

17. The projection-type display apparatus according to claim 1, wherein the light intensity equalizing device comprises a polygonal pillar-shaped member formed of a transparent material and reflects the light flux on an interface between the transparent material and atmosphere.

18. The projection-type display apparatus according to claim 1, wherein the light intensity equalizing device comprises a lens array, in which a plurality of lens elements in a planar manner.

* * * * *

UNITED STATES PATENT AND TRADEMARK OFFICE
CERTIFICATE OF CORRECTION

PATENT NO. : 8,469,525 B2  
APPLICATION NO. : 12/644731  
DATED : June 25, 2013  
INVENTOR(S) : Kuniko Kojima et al.

Page 1 of 1

It is certified that error appears in the above-identified patent and that said Letters Patent is hereby corrected as shown below:

IN THE CLAIMS:

In claim 1, at column 12, line 26, change "comprising" to --comprises:--; at line 29, change "valve," to --valve;--; at line 32, after "and", insert --wherein--; and at line 33, change "a conjugated" to --the conjugated--.

In claim 8, at column 13, line 2, change "is" to --are--.

In claim 18, at column 14, line 17, after "lens elements", insert --are arrayed--.

Signed and Sealed this  
Twentieth Day of August, 2013

Teresa Stanek Rea  
*Acting Director of the United States Patent and Trademark Office*